United States Patent
Shen et al.

[15] 3,676,422
[45] July 11, 1972

[54] 5'ADAMANTOYL-2'-DEOXY-5-METHYLAMINOURIDINE

[72] Inventors: Tsung-Ying Shen, Westfield; Kay H. Boswell, Clark, both of N.J.

[73] Assignee: Merck & Co., Inc., Rahway, N.J.

[22] Filed: Sept. 17, 1970

[21] Appl. No.: 73,206

[52] U.S. Cl. .................................260/211.5 R, 260/999
[51] Int. Cl. ..........................................C07d 51/52
[58] Field of Search ...........................260/211.5 R

[56] References Cited

UNITED STATES PATENTS 3,575,959    4/1971    Shen et al.........................260/211.5 R Primary Examiner—Lewis Gotts
Assistant Examiner—Johnnie R. Brown
Attorney—Hesna J. Pfeiffer, J. Jerome Behan and I. Louis Wolk

[57] ABSTRACT

A novel nucleoside, 5'-adamantoyl-2'-deoxy-5-methylaminouridine is prepared by adamantoylation of 5-methylamino-2'-deoxyuridine (MADU), using $\beta,\beta,\beta$-trichloroethoxycarbonyl as a protective group on the 5-methylamino substituent. The compound is useful as an antiviral agent, specifically against herpes Keratitis in tissue culture.

1 Claim, No Drawings

5'ADAMANTOYL-2'-DEOXY-5-METHYLAMINOURIDINE

SUMMARY OF THE INVENTION

This invention relates to a new nucleoside, 5'-adamantoyl-2'-deoxy-5-methylaminouridine, having antiviral activity.

DESCRIPTION OF THE PRIOR ART

5-Methylamino-2'-deoxyuridine (hereinafter referred to as MADU) and its 5'-loweralkanoyl derivatives are known compounds useful against Herpes simplex infections, see U.S. Pat. No. 3,322,627 assigned to the same assignee. The particular novel compound of the instant application, the 5'-adamantoyl derivative of MADU, has heretofore been undescribed in the literature, except by us in the *Medicinal Chemistry Section* of the Abstracts for the 160th American Chemistry Society National Meeting, Sept. 14–17, 1970, Chicago, Illinois.

SPECIFIC EMBODIMENTS OF THE INVENTION

5'-Adamantoyl-2'-deoxy-5-methylaminouridine is superior in antiviral activity to the parent compound, MADU. It is more effective than the parent compound against herpes viruses. Although we do not wish to be broad by theory, this increased activity is probably due to improved absorption and in vivo liberation of the active compound. The presence of the hydrophobic adamantoyl group increases cellular uptake of the compound.

The 5'-adamantoyl derivative of MADU is prepared from MADU after the 5-methylamino moiety is protected from the O-acylation reaction by blockage with a $\beta,\beta,\beta$-trichloroethylchloroformate. This latter compound is reacted with MADU in a solvent, such as pyridine. The reaction temperature is 0°–50° C., and preferably 0°–15° C. The chloroformate reagent is employed in about an equimolar amount of compound with the MADU. The reaction proceeds to completion within 2–24 hours. After quenching in water or a similar solvent, the crude product is removed after evaporation of the solvent.

The blocked MADU is then reacted with 1-adamantane carboxylic acid halide in an inert solvent at 0°–35° C. for 4–24 hours.

The final 5'-adamantoyl MADU is prepared by the reduction of the blocking group in an inert solvent, such as dimethylformamide. A small amount of acid, such as acetic acid, is added. A catalyst, such as zinc dust, is also present. The reaction is completed within 2–10 hours at ambient temperatures.

This invention is further illustrated by the following examples.

EXAMPLE 1

5-(N-methyl-$\beta,\beta,\beta$-trichloroethylcarbamoyl)-2'-deoxyuridine 2.57 G. of dry 5'-methylamino-2'-deoxyuridine (MADU) is taken up into 100 ml. of dry pyridine and the resulting solution is cooled to 0° C. 2.11 G. of 2,2,2-trichloroethyl chloroformate is added dropwise with rapid stirring to the cold solution. The resulting solution is allowed to come to room temperature overnight. 10 Ml. of water is added and after stirring for 1 hour, the solution is reduced to a gum in vacuo. The crude residue is chromatographed on Baker:silica gel using a gradiant (1–3 percent) of methanol in methylene chloride. The fractions which contain product are pooled to yield 1.46 g., identified as 5-(N-methyl-$\beta,\beta,\beta$-trichloroethylcarbamoyl)-2'-deoxyuridine.

EXAMPLE 2

5-(N-methyl-$\beta,\beta,\beta$-trichloroethylcarbamoyl)-5'-adamantoyl-2'-deoxyuridine 1.16 G. of 5-(N-methyl-$\beta,\beta,\beta$-trichloroethylcarbamoyl)-2'-deoxyuridine is dried by twice taking it up in dry pyridine and evaporating the solution to dryness in vacuo. The resulting dry residue is taken up in 75 ml. of dry pyridine, cooled to 0° C. and 690 mg. of 1-adamantane carboxylic acid chloride added with stirring. The resulting solution is allowed to come to room temperature overnight. 20 Ml. of water is added and after stirring for 1 hour, the solution is evaporated to a gum in vacuo. The gum is taken up in ethanol, and the resulting solution is evaporated to dryness in vacuo. This is repeated until a foam is produced. The foam is chromatographed on Baker:silica gel using 2 percent methanol in methylene chloride. The fractions containing product are pooled to yield 900 mg. of product, identified as 5-(N-methyl-$\beta,\beta,\beta$-trichloroethylcarbamoyl)-5'-adamantoyl-2'-deoxyuridine.

EXAMPLE 3

5'-Adamantoyl-2'-deoxy-5-methylaminouridine

To a solution of 850 mg. of dry 5-(N-methyl-$\beta,\beta,\beta$-trichloroethylcarbamoyl)-5'-adamantoyl-2'-deoxyuridine, 1-adamantane carboxylate in 5 ml. of dry dimethylformamide and 5 ml. of glacial acetic acid, is added 3 g. of zinc dust in small portions. The resulting suspension is stirred at room temperature until the reduction is complete as judged by U.V. (approximately 2 hours). The solvent is removed in vacuo, and the residue is taken up in ethanol and the resulting solution evaporated to dryness in vacuo. This is repeated until a dry foam is obtained. The foam is chromatographed on Baker:silica gel using 75 percent ethylacetate–25 percent benzene. The fractions which contain product are pooled and taken up in a small volume of ethylacetate. To this solution is added 20 volumes of ethyl ether. The solid which formed is filtered, washed with ether, and dried to yield 404 mg. of product, 5'-adamantoyl-2'-deoxy-5-methylaminouridine.

What is claimed is:

1. 5'-Adamantoyl-2'-deoxy-5-methylaminouridine.

* * * * *